(12) United States Patent
Tsirkin et al.

(10) Patent No.: US 9,053,068 B2
(45) Date of Patent: Jun. 9, 2015

(54) RDMA-BASED STATE TRANSFER IN VIRTUAL MACHINE LIVE MIGRATION

(71) Applicant: Red Hat Israel, Ltd., Raanana (IL)

(72) Inventors: Michael Tsirkin, Yokneam Yillit (IL); Orit Wasserman, Mitzpe Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/036,288

(22) Filed: Sep. 25, 2013

(65) Prior Publication Data

US 2015/0089010 A1 Mar. 26, 2015

(51) Int. Cl.
*G06F 15/167* (2006.01)
*G06F 15/173* (2006.01)
*G06F 12/14* (2006.01)
*G06F 13/28* (2006.01)

(52) U.S. Cl.
CPC ...... *G06F 15/17331* (2013.01); *G06F 12/1441* (2013.01); *G06F 13/28* (2013.01)

(58) Field of Classification Search
CPC ..... G06F 12/126; G06F 8/4441; G06F 8/456; G06F 12/1081; G06F 13/28; G06F 12/1027; G06F 12/1441; H04L 67/1097
USPC ............................................. 709/212; 710/22
See application file for complete search history.

(56) References Cited

U.S. PATENT DOCUMENTS

| | | | |
|---|---|---|---|
| 8,146,082 B2 | 3/2012 | Belay | |
| 8,151,032 B2 | 4/2012 | Oshins | |
| 8,327,355 B2 | 12/2012 | Dow et al. | |
| 8,387,049 B2 | 2/2013 | Adlung et al. | |
| 2008/0307188 A1 | 12/2008 | Franaszek et al. | |
| 2009/0276765 A1* | 11/2009 | Das et al. | 717/154 |
| 2013/0086298 A1 | 4/2013 | Alanis et al. | |
| 2013/0086582 A1 | 4/2013 | Cardona et al. | |

OTHER PUBLICATIONS

C. Isci, et al.; "Improving Server Utilization Using Fast Virtual Machine Migration", http://www.canturkisci.com/ETC/papers/IBMJRD2011/preprint.pdf, IBM J. Res. & Dev., vol. 55, No. 6, Paper 4, Nov./Dec. 2011, 12 pages.
Andrew Whitaker, et. el., "Construction Services with Interposable Virtual Hardware", http://static.usenix.org/publications/library/proceedings/nsdi04/tech/full_papers/whitaker/whitaker_html/index.html; USENIX, NDSI '04 Technical Paper; 23 pages.

(Continued)

*Primary Examiner* — Farley Abad
(74) *Attorney, Agent, or Firm* — Lowenstein Sandler LLP

(57) ABSTRACT

Systems and methods for RDMA-based state transfer in virtual machine live migration. An example method may comprise: determining, by a first computer system, that a memory block has been modified by a virtual machine undergoing live migration from the first computer system to a second computer system; designating the modified memory block for transfer via a remote direct memory access (RDMA) adapter to the second computer system; selecting, asynchronously with respect to the designating, a memory block from a plurality of memory blocks designated for RDMA transfer to the second computer system, wherein a sum of an amount of pinned physical memory in the first computer system and a size of the selected memory block does not exceed a predefined value; registering the selected memory block with the RDMA adapter; and transmitting the selected memory block to the second computer system via the RDMA adapter.

25 Claims, 6 Drawing Sheets

(56) References Cited

OTHER PUBLICATIONS

Edwin Zhai, et al. "Live Migration with Pass-through Device for Linux VM", https://www.kernel.org/doc/ols/2008/ols2008v2-pages-261-267.pdf, 9 pages.

Christopher Clark, "Live Migration of Virtual Machines", http://www.cl.cam.ac.uk/research/srg/netos/papers/2005-migration-nsdi-pre.pdf, 14 pages.

Michael R. Hines, [Qemu-devel] [RFC PATCH RDMA support v5: Mar. 2012] comprehensive protocol documentation, https://lists.gnu.org/archive/html/qemu-devel/2013-04/msg01518.html, Apr. 8, 2013, 8 pages.

Tsirkin, Michael S., "[Qemu-devel] [RFC PATCH RDMA support v5: Mar. 2012] comprehensive protocol documentation", https://lists.gnu.org/archive/html/qemu-devel/2013-04/msg02189.html, Apr. 11, 2013, 5 pages.

* cited by examiner

RDMA-BASED STATE TRANSFER IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
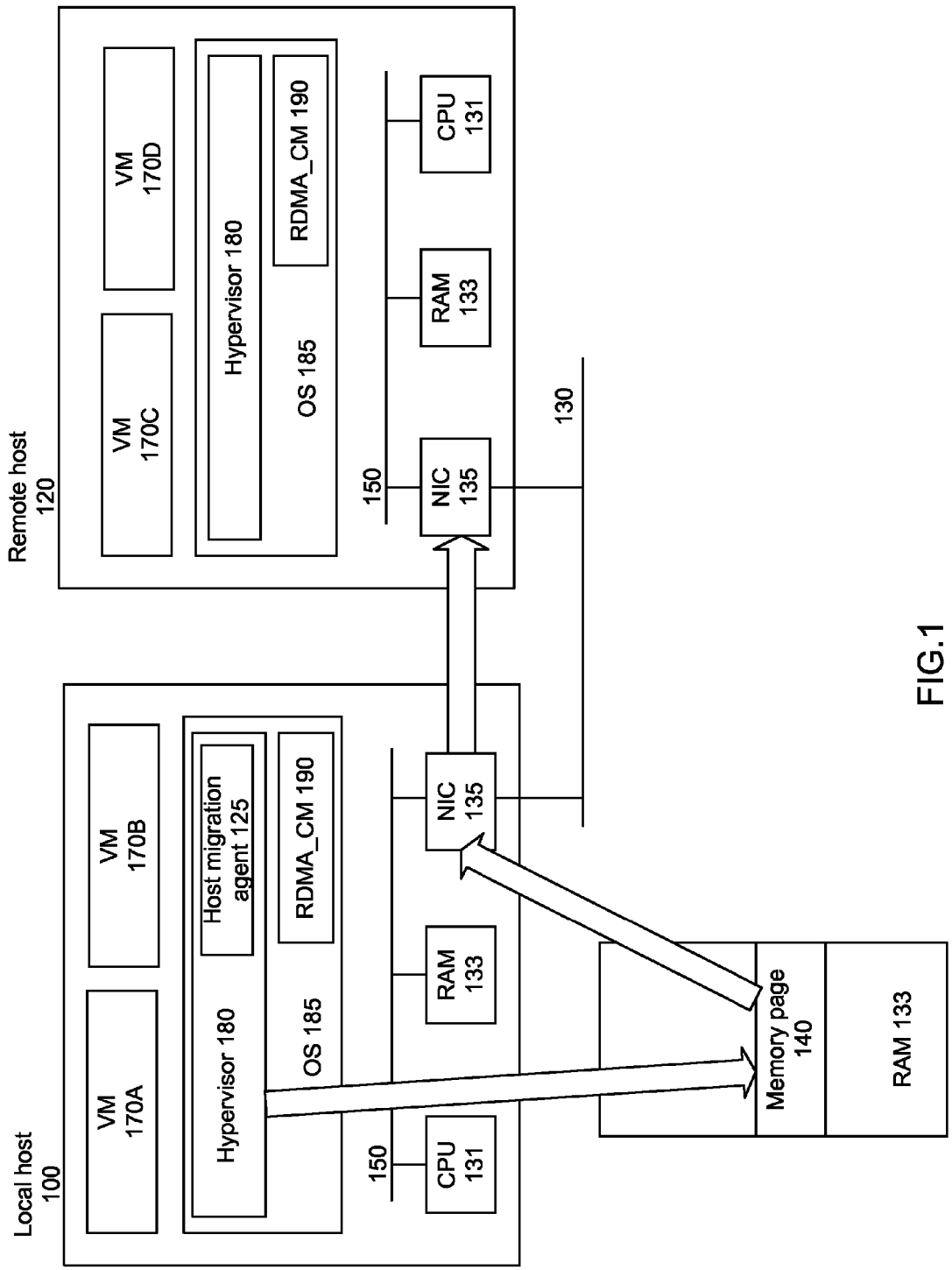
FIG. 1 depicts a high-level component diagram of one illustrative embodiment of a computer system 1000 in accordance with one or more aspects of the present disclosure.

Described herein are methods and systems for RDMA-based state transfer in virtual machine live migration. "Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

Remote Direct Memory Access (RDMA) is a method allowing a computer system to directly read or modify the memory of another computer system. RDMA-enabled network interface adapter establishes connections to transfer the data directly between specified buffers in the user-space memory. Such data transfers require no work to be done by processors and no context switches, and the transfers may continue in parallel with other system operations. When an application performs an RDMA read or write request, the application data is delivered directly to the network, reducing latency and enabling fast data transfer.

Before performing an RDMA-based transfer, the memory block being transferred should be registered with RDMA-enabled network interface controller (RNIC). In the process of registration, the memory block gets "pinned," i.e., designated as being non-swappable to a secondary storage. Then, the RNIC stores the mapping of a virtual address of the memory block to the corresponding physical address.

In conventional systems, the execution state of a virtual machine being migrated is synchronized, pinned and registered before the migration process starts. Alternatively, the state may be partially synchronized when a change is detected. To improve the efficiency of migration, the state may be kept registered through the migration process. That means that the size of the virtual machine state could not exceed the amount of physical memory in the host computer system, thus precluding the host from overcommitting the memory. As the virtual machine execution state may have a size of several gigabytes, overcommitting the host physical memory may be highly desirable, especially for host computer systems running multiple virtual machines.

Aspects of the present disclosure address the above noted deficiencies by detecting the virtual machine state modifications and processing them in a pipelined fashion while limiting the total amount of pinned memory in the host computer system. Modified memory blocks may be enqueued for RDMA transfer. An enqueued memory block may be retrieved from the queue if the amount of pinned memory falls below a pre-defined threshold value reduced by the size of the block. The least recently modified, most recently modified, or most frequently modified memory block may be selected. The selected memory block may be pinned, registered with the RDMA adapter and transmitted to the remote host computer system. Upon completing the transfer, the memory block may be unregistered and unpinned, thus freeing up the system memory for registering next memory blocks to be transmitted.

The methods described herein below may be implemented by both hypervisors running on host computer systems to enable virtual machine live migration, as well as by non-virtualized computer systems for RDMA-based transfer of large amounts of data. Various aspects of the above referenced methods and systems are described in details herein below by way of examples, rather than by way of limitation.

FIG. 1 depicts a high-level component diagram of one illustrative example of a computer system 100 in accordance with one or more aspects of the present disclosure. "Computer system" herein shall refer to a system comprising one or more processors, one or more memory devices, and one or more input/output (I/O) interfaces.

Computer system 100 may be interconnected, via a network 130, with one or more remote computers. Computer system 100 may comprise one or more processors 131 communicatively coupled to a memory device 133 and a network interface controller (NIC) 135. Local connections within host computer system 110, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "Network interface adapter" herein shall refer to a device capable of implementing a physical layer and data link layer standard (such as Ethernet or InfiniBand).

In an illustrative example, as schematically illustrated by FIG. 1, computer system 100 may run multiple virtual machines 170 by executing a software layer 180, often referred to as "hypervisor," above the hardware and below the virtual machines. In certain implementations, hypervisor 180 may be a component of operating system 185 executed by host computer system 100. Alternatively, hypervisor 180 may be provided by an application running under host operating system 185, or may run directly on the host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agent 125 running on host computer system 100 may perform virtual machine migration management functions in accordance with one or more aspects of the present disclosure. In certain implementations, host migration agent may be implemented as a software component invoked by hypervisor 180. Alternatively, functions of host migration agent 125 may be performed by hypervisor 180.

In certain implementations, computer system 100 may support RDMA. RDMA-enabled network interface controller (RNIC) 135 may be provided, e.g., by a RDMA-enabled Ethernet adapter or InfiniBand host channel adapter. RNIC 135 may be programmed to directly read or write the user space memory. Before performing an RDMA operation with respect to a user space memory block, RDMA communications manager 190 may register the memory block with RNIC 135.

Memory registration is a mechanism that allows an application to describe a plurality of virtually contiguous memory locations or a plurality of physically contiguous memory locations to the network adapter as a virtually contiguous memory block using virtual addresses. In the process of registration, RDMA communications manager 190 may "pin" the memory block, i.e., make it non-swappable to a secondary storage. Then, RNIC may store a mapping of the virtual address of the memory block to a corresponding physical address in the physical memory.

Prior to performing RDMA read or write operations, appropriate permissions to access the memory may be specified by the remote host. A local process initiating an RDMA read operation may specify a remote memory address and a local memory address. The RNIC may copy one or more memory pages from the remote address to the local address specified. A local process initiating an RDMA write operation may specify a local address and a remote address. The RNIC may copy one or more memory pages from the local address to the remote address specified. RDMA read/write operations may be conducted with no notification to the remote host.

As noted herein above, in conventional systems, the execution state of a virtual machine being migrated is synchronized, pinned and registered before the migration process starts. Alternatively, the state may be partially synchronized when a change is detected. To improve the efficiency of migration, the state may be kept registered through the migration process. That means that the size of the virtual machine state could not exceed the amount of physical memory in the host computer system, thus precluding the host from over-committing the memory. As the virtual machine execution state may have a size of several gigabytes, overcommitting the host physical memory may be highly desirable, especially for host computer systems running multiple virtual machines.

In accordance with one or more aspects of the present disclosure, host migration agent 125 running on origin host computer system 100 may detect virtual machine state modifications and process them in a pipelined fashion. The pipelined processing of modified memory blocks allows limiting the total amount of pinned memory in host computer system 100.

In an illustrative example, virtual machine 170A may be undergoing live migration from local host computer system 100 to remote host computer system 120, as schematically illustrated by FIG. 1. Live migration may involve copying the virtual machine execution state from the origin host to the destination host. The virtual machine execution state may comprise the memory state, the virtual processor state, the virtual devices state, and/or the connectivity state. Host migration agent 125 may manage copying, over network 130, the execution state of migrating virtual machine 170A, including a plurality of memory pages 140, from local host 100 to remote host 120 while virtual machine 170A is still running on local host 110.

In an illustrative example, host migration agent 125 running on origin host computer system 100 may detect that a memory block has been modified by virtual machine 170A. Responsive to detecting the memory block modification, host migration agent 125 may designate the modified memory block to be RDMA-transferred to destination host computer system 120. In certain implementations, host migration agent 125 may append a reference to the modified memory block to a data structure containing references to memory blocks to be transferred to the destination host computer system. In an illustrative example, the data structure may be provided by a queue, thus a reference to the least recently modified memory block will be retrieved first. In another illustrative example, the data structure may be provided by a stack, thus a reference to the most recently modified memory block will be retrieved first. In another illustrative example, the data structure may be provided by an array storing references to modified memory blocks and counters of number of modifications to each memory block, thus allowing retrieval of the most frequently modified memory block.

Asynchronously with respect to designating memory blocks for RDMA transfer, the host migration agent may select, from the plurality of memory blocks designated for RDMA transfer, a memory block and initiate the RDMA transfer of the selected memory block to the destination computer system. In certain implementations, the total amount of pinned memory in the origin host computer system may be limited by a pre-defined threshold value. Thus, a memory block may be selected for the RDMA transfer having the size not exceeding the difference between the pre-defined threshold value and the amount of currently pinned memory.

The selected memory block may be pinned, registered with the RDMA adapter and transferred to the remote host computer system via the RDMA adapter. Upon completing the transfer, the host migration agent may unregister and unpin the memory block, thus freeing up the system memory for registering the next memory blocks to be transferred. Responsive to determining that the amount of pinned memory in the computer system has fallen below a threshold, the host migration agent may select the next memory block to be RDMA-transferred to the destination computer system.

Figure 2:
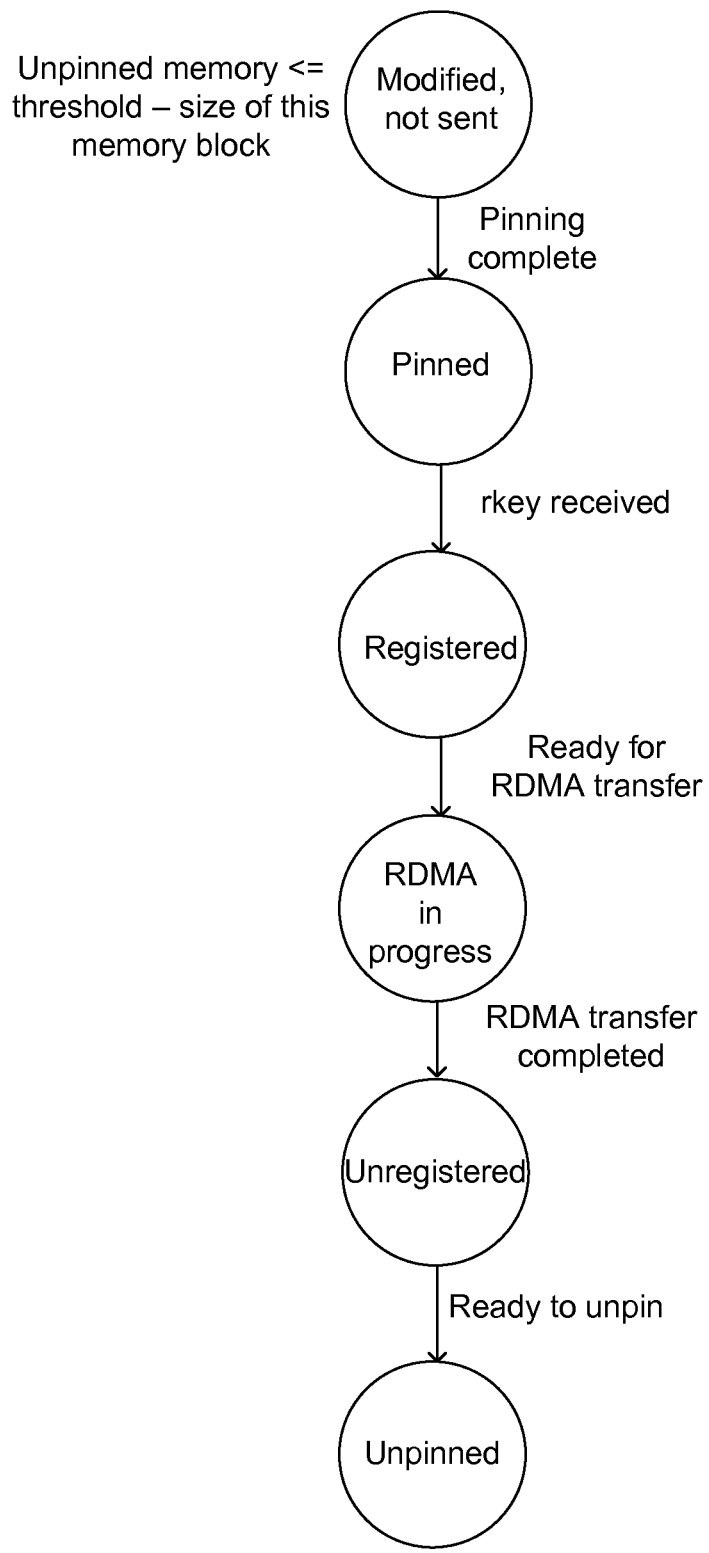
FIG. 2 schematically illustrates a state machine implemented by an example method for RDMA-based state transfer, in accordance with one or more aspects of the present disclosure.

As schematically illustrated by FIG. 2, each memory block to be RDMA-transferred may transition through the following states: modified not sent—pinned—registered—RDMA in progress—unregistered—unpinned sent. Modified, not sent state is the initial state of a memory block that has been selected for RDMA processing workflow, e.g., by determining that the memory block has a size such that the sum of the amount of pinned memory in the computer system and the size of the memory block does not exceed a pre-defined maximum pinned memory amount. In certain implementations, the least recently modified, most recently modified, or most frequently modified memory block satisfying the above described size limiting condition may be selected.

The selected Modified, not sent memory block may be pinned," i.e., designated as being non-swappable to a secondary storage, and hence may transition to Pinned state. Then, the RNIC may register the memory block, by storing the mapping of the virtual address of the memory block to the corresponding physical address, and requesting a key value, referred to as rkey, from the remote computer system. The rkey value authorizes the local RDMA adapter to access a corresponding memory block at the remote computer system. Upon receiving the rkey value from the remote computer system, the local computer system may promote the memory block to the Registered state. The Registered memory block may be transmitted to the remote computer system by the RDMA adapter. Responsive to completing the RDMA transfer, the local computer system may unregister and unpin the transmitted memory block.

Figure 3:
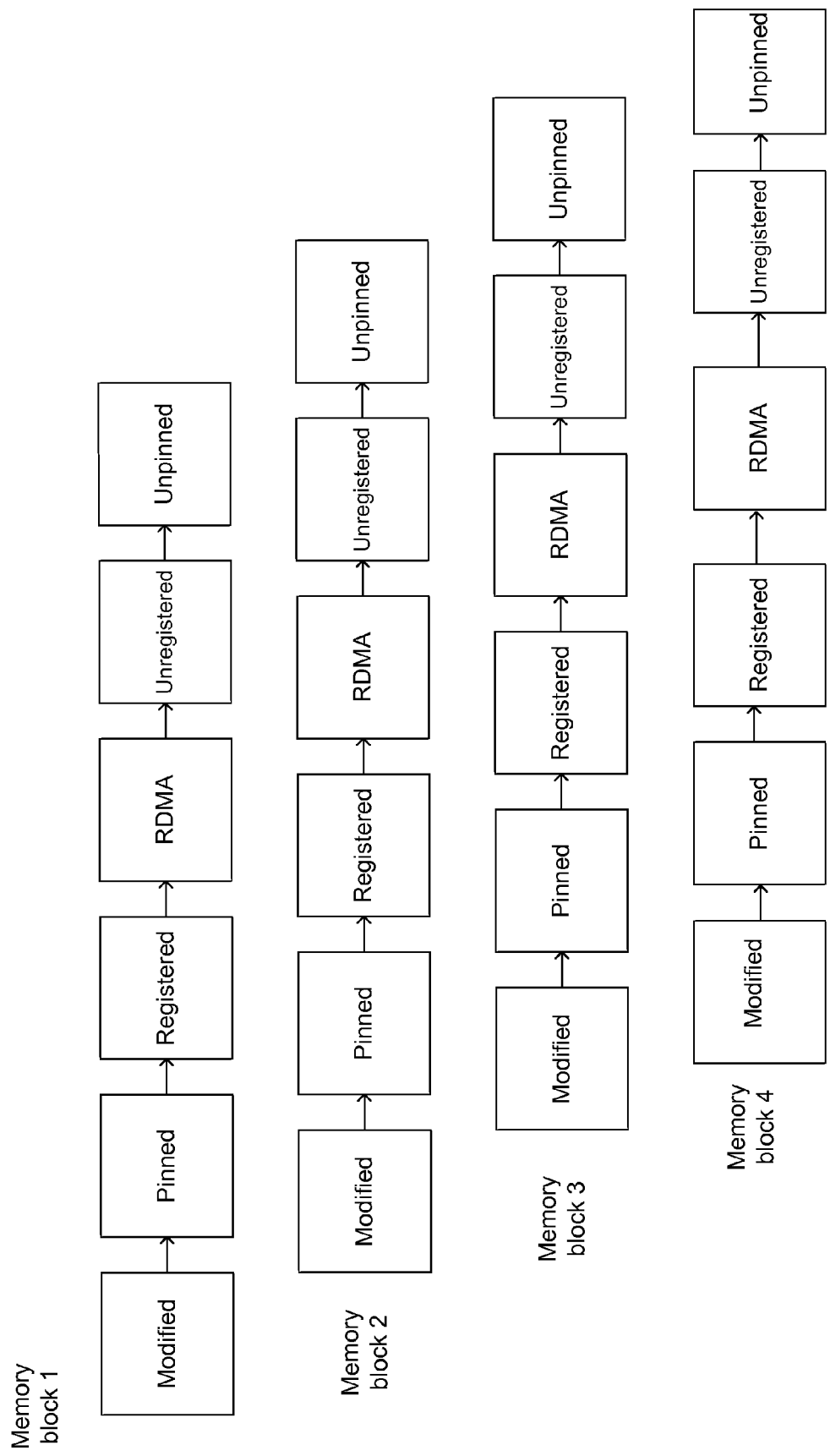
FIG. 3 schematically illustrates the pipeline processing a plurality of memory blocks for RDMA transfer to a remote computer system, in accordance with one or more aspects of the present disclosure.

In certain implementations, the local computer system may process several memory blocks simultaneously, holding in the outbound queue the memory blocks having sizes that would require the amount of pinned memory at the local computer system to exceed the maximum pinned memory threshold value. FIG. 3 schematically illustrates the pipeline processing a plurality of memory blocks for RDMA transfer to the remote computer system. The pipelined processing of modified memory blocks allows limiting the total amount of pinned memory in the local host computer system.

Figure 4:
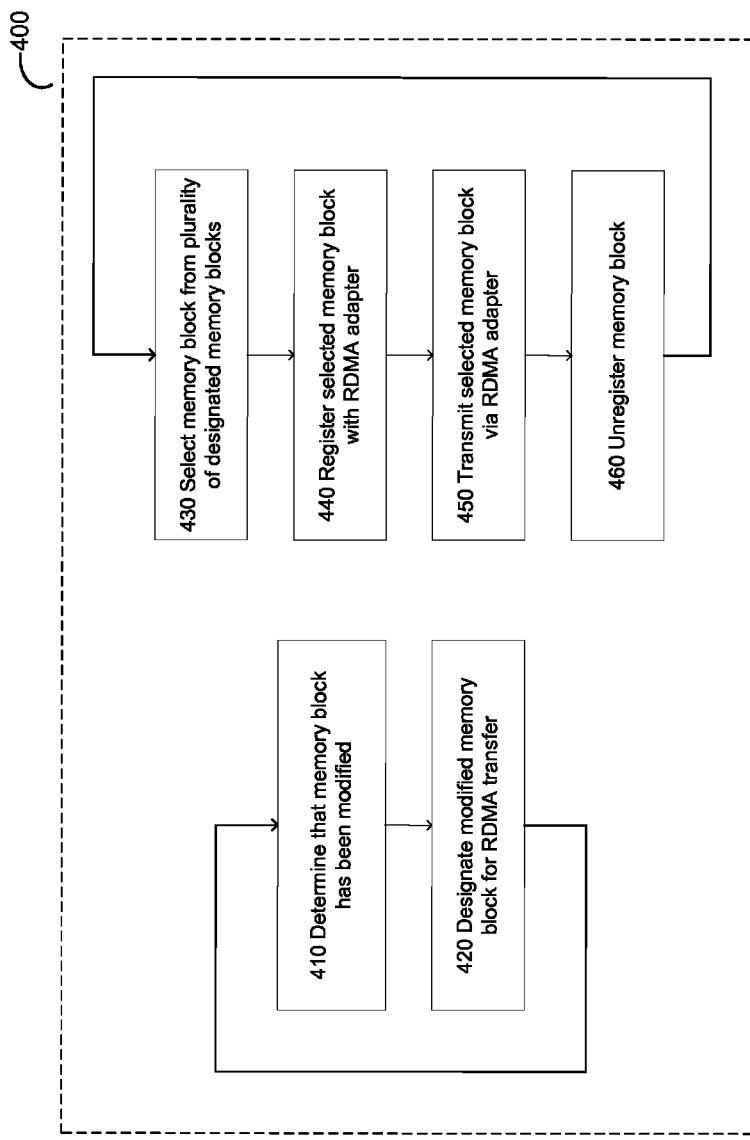
FIGS. 4-5 depict a flow diagrams of example methods for RDMA-based state transfer in virtual machine live migration, in accordance with one or more aspects of the present disclosure.

FIG. 4 depicts a flow diagram of an example method 400 for RDMA-based state transfer in virtual machine live migration. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more physical processors of the computer system executing the method.

At block 410, the host migration agent may determine that a memory block has been modified by a virtual machine undergoing live migration to the remote computer system.

At block 420, the host migration agent may designate the modified memory block for transfer via an RDMA adapter to the remote computer system. In certain implementations, host migration agent 125 may append a reference to the modified memory block to a data structure containing references to memory blocks to be transferred to the destination host computer system. The least recently modified, most recently modified, or most frequently modified memory block may be selected, as described in more details herein above. Upon completing the operations schematically described by block 420, the method may loop back to block 410.

At block 430, asynchronously with respect to designating memory blocks for RDMA transfer, the host migration agent may select a memory block from a plurality of memory blocks designated for RDMA transfer to the second computer system. In certain implementations, the selected memory block may have the size not exceeding the difference between a pre-defined maximum pinned memory threshold amount and the amount of currently pinned memory, as described in more details herein above.

At block 440, the host migration agent may register the selected memory block with the RDMA adapter, as described in more details herein above.

At block 450, the host migration agent may transmit the selected memory block to the remote computer system via the RDMA adapter.

At block 460, the host migration agent may unregister and unpin the transmitted memory block, thus releasing the system memory for registering the next memory blocks to be transferred. Upon completing the operations schematically described by block 460, the method may loop back to block 430 to continue the pipelined processing of modified memory blocks.

Figure 5:
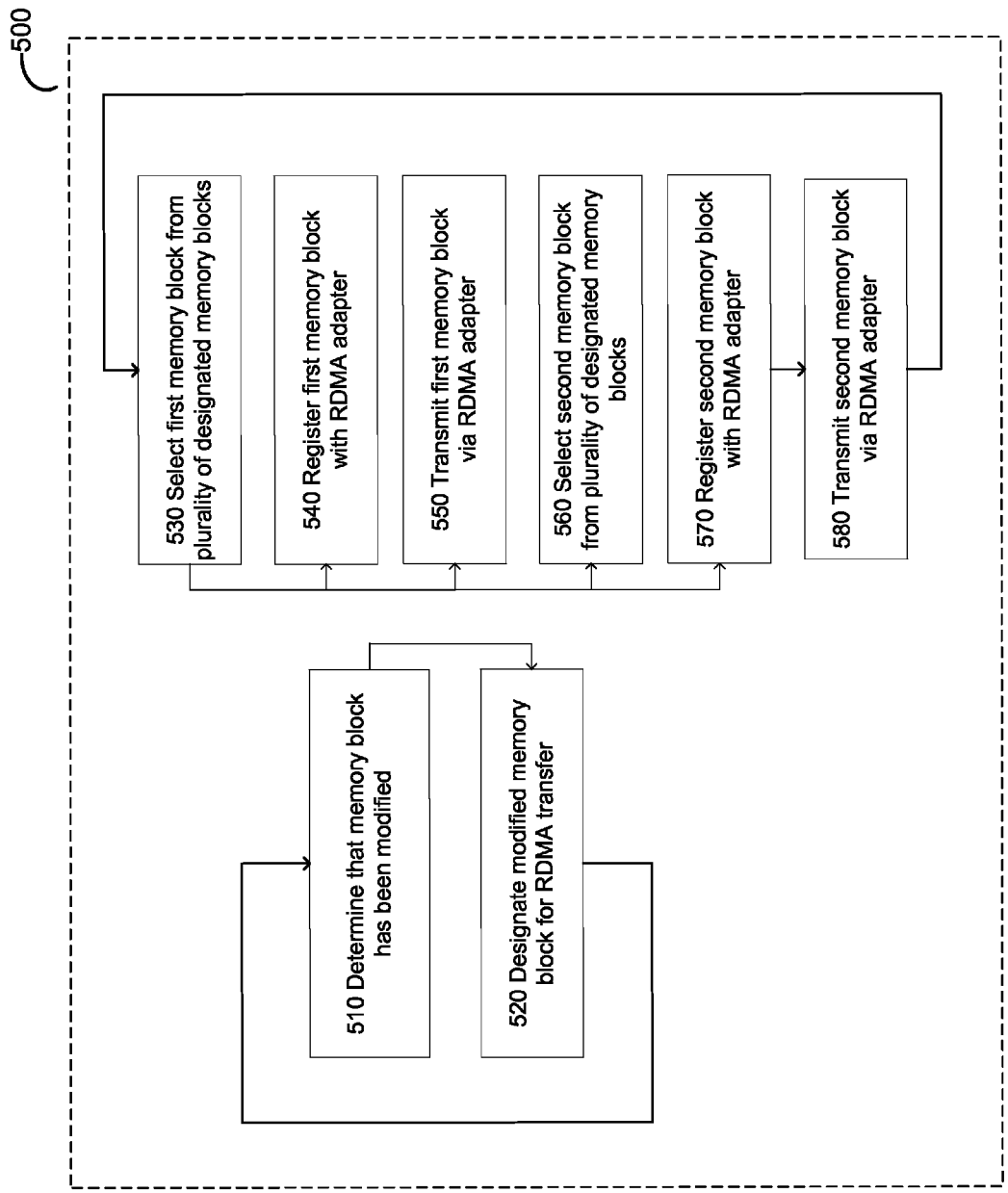

FIG. 5 depicts a flow diagram of another example method 500 for RDMA-based state transfer in virtual machine live migration. Method 500 may be performed by a computer system that may comprise hardware (e.g., circuitry, dedicated logic, and/or programmable logic), software (e.g., instructions executable on a computer system to perform hardware simulation), or a combination thereof. Method 500 and/or each of its individual functions, routines, subroutines, or operations may be performed by one or more physical processors of the computer system executing the method.

At block 510, the host migration agent may determine that a memory block has been modified by a virtual machine undergoing live migration to the remote computer system.

At block 520, the host migration agent may designate the modified memory block for transfer via an RDMA adapter to the remote computer system, as described in more details herein above. Upon completing the operations schematically described by block 520, the method may loop back to block 510.

At block 530, asynchronously with respect to designating memory blocks for RDMA transfer, the host migration agent may select a first memory block of a plurality of memory blocks designated for RDMA transfer to the second computer system.

At block 540, the host migration agent may register the first memory block with the RDMA adapter, as described in more details herein above.

At block 550, the host migration agent may transmit the first memory block to the remote computer system via the RDMA adapter.

At block 560, the host migration agent may, responsive to completing the transmission of the first memory block, select a second memory block from a plurality of memory blocks designated for RDMA transfer to the second computer system.

At block 570, the host migration agent may register the second memory block with the RDMA adapter, as described in more details herein above.

At block 580, the host migration agent may transmit the second memory block to the remote computer system via the RDMA adapter. Upon completing the operations schematically described by block 580, the method may loop back to block 530 to continue the pipelined processing of modified memory blocks.

Figure 6:
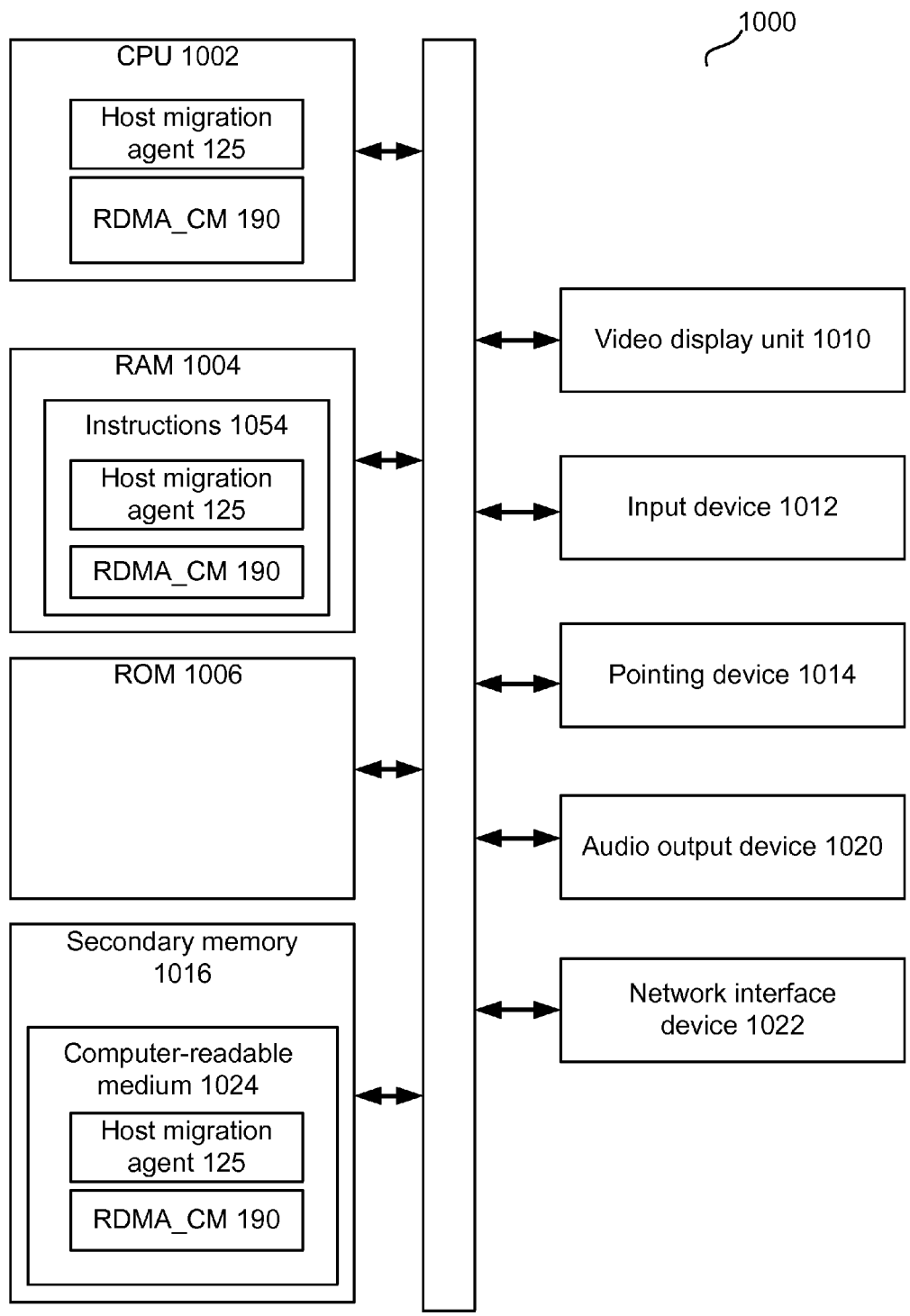
FIG. 6 depicts a block diagram of an illustrative computer system operating in accordance with the examples of the present disclosure.

FIG. 6 depicts an example computer system 1000 within which a set of instructions, for causing the computer system to perform any one or more of the methods described herein, may be executed. In certain implementations, computer system 1000 may correspond to computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of host migration agent 125 and RDMA communications manager 190 implementing methods 400 and/or 500 for RDMA-based state transfer in virtual machine live migration. Instructions of host migration agent 125 and RDMA communications manager 190 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:

determining, by a processor of a first computer system, that a memory block has been modified by a virtual machine undergoing live migration from the first computer system to a second computer system;

designating the modified memory block for transfer via a remote direct memory access (RDMA) adapter to the second computer system;

selecting, asynchronously with respect to the designating, a memory block from a plurality of memory blocks designated for RDMA transfer to the second computer system, wherein a sum of an amount of pinned physical memory in the first computer system and a size of the selected memory block does not exceed a pre-defined value;

registering the selected memory block with the RDMA adapter; and transmitting the selected memory block to the second computer system via the RDMA adapter.

2. The method of claim 1, wherein the memory block comprises one or more memory pages.

3. The method of claim 1, wherein registering the selected memory block with the RDMA adapter comprises pinning the selected memory block.

4. The method of claim 1, wherein designating the modified memory block for transfer comprises appending a reference to the modified memory block to a queue.

5. The method of claim 1, wherein selecting a memory block comprises selecting a least recently modified memory block among designated for RDMA transfer memory blocks having a size less than a difference of the pre-defined value and the amount of pinned memory in the first computer system.

6. The method of claim 1, wherein selecting a memory block comprises selecting a most recently modified memory block among designated for RDMA transfer memory blocks having a size less than a difference of the pre-defined value and the amount of pinned memory in the first computer system.

7. The method of claim 1, wherein selecting a memory block comprises selecting a most frequently modified memory block among designated for RDMA transfer memory blocks having a size less than a difference of the pre-defined value and the amount of pinned memory in the first computer system.

8. The method of claim 1, further comprising:

unregistering the memory block with the RDMA adapter; and unpinning the memory block.

9. The method of claim 1, further comprising:

selecting a next memory block from a plurality of memory blocks designated for RDMA transfer to the second computer system, wherein a sum of an amount of pinned physical memory in the first computer system and a size of the selected memory block does not exceed a pre-defined value.

10. A method, comprising:

determining, by a processor of a first computer system, that a plurality of memory blocks have been modified by a virtual machine undergoing live migration from the first computer system to a second computer system;

selecting, asynchronously with respect to the determining, a first memory block of the plurality of memory blocks;

registering the first memory block with an RDMA adapter for transfer to the second computer system;

transmitting the first memory block to the second computer system via the RDMA adapter;

responsive to transmitting the first memory block, selecting a second memory block of the plurality of memory blocks;

registering the second memory block with an RDMA adapter for transfer to the second computer system; and transmitting the second memory block to the second computer system via the RDMA adapter;

wherein registering a memory block with the RDMA adapter comprises pinning the memory block and wherein an amount of pinned physical memory in the first computer system does not exceed a pre-defined value.

11. The method of claim 10, wherein the memory block comprises one or more memory pages.

12. The method of claim 10, wherein transmitting a memory block comprises:

unregistering the memory block with the RDMA adapter; and unpinning the memory block.

13. The method of claim 10, wherein selecting a memory block comprises selecting a memory block among designated for RDMA transfer memory blocks having a size less than a difference of the pre-defined value and the amount of pinned memory in the first computer system.

14. A system of a first computer system, comprising:

a memory;

a remote direct memory access (RDMA) adapter coupled to the memory; and a processor, coupled to the memory, to:

determine that a memory block has been modified by a virtual machine undergoing live migration from the first computer system to a second computer system;

designate the modified memory block for transfer via a remote direct memory access (RDMA) adapter to the second computer system;

select, asynchronously with respect to the designating, a memory block from a plurality of memory blocks designated for RDMA transfer to the second computer system, wherein a sum of an amount of pinned physical memory in the first computer system and a size of the selected memory block does not exceed a pre-defined value;

register the selected memory block with the RDMA adapter; and transmit the selected memory block to the second computer system via the RDMA adapter.

15. The system of claim 14, wherein the memory block comprises one or more memory pages.

16. The system of claim 14, wherein registering the selected memory block with the RDMA adapter comprises pinning the selected memory block.

17. The system of claim 14, wherein selecting a memory block comprises selecting a least recently modified memory block among designated for RDMA transfer memory blocks having a size less than a difference of the pre-defined value and the amount of pinned memory in the first computer system.

18. The system of claim 14, wherein selecting a memory block comprises selecting a most recently modified memory block among designated for RDMA transfer memory blocks having a size less than a difference of the pre-defined value and the amount of pinned memory in the first computer system.

19. The system of claim 14, wherein selecting a memory block comprises selecting a most frequently modified memory block among designated for RDMA transfer memory blocks having a size less than a difference of the pre-defined value and the amount of pinned memory in the first computer system.

20. The system of claim 14, wherein the processors are further to:
  unregistering the memory block with the RDMA adapter; and
  unpinning the memory block.

21. A computer-readable non-transitory storage medium comprising executable instructions that, when executed by a processor, cause the processor to:
  determine, by the processor, that a memory block has been modified by a virtual machine undergoing live migration from a first computer system to a second computer system;
  designate the modified memory block for transfer via a remote direct memory access (RDMA) adapter to the second computer system;
  select, asynchronously with respect to the designating, a memory block from a plurality of memory blocks designated for RDMA transfer to the second computer system, wherein a sum of an amount of pinned physical memory in the first computer system and a size of the selected memory block does not exceed a pre-defined value;
  register the selected memory block with the RDMA adapter; and
  transmit the selected memory block to the second computer system via the RDMA adapter.

22. The computer-readable non-transitory storage medium of claim 21, wherein registering the selected memory block with the RDMA adapter comprises pinning the selected memory block.

23. The computer-readable non-transitory storage medium of claim 21, wherein selecting a memory block comprises selecting a least recently modified memory block among designated for RDMA transfer memory blocks having a size less than a difference of the pre-defined value and the amount of pinned memory in the first computer system.

24. The computer-readable non-transitory storage medium of claim 21, wherein selecting a memory block comprises selecting a most recently modified memory block among designated for RDMA transfer memory blocks having a size less than a difference of the pre-defined value and the amount of pinned memory in the first computer system.

25. The computer-readable non-transitory storage medium of claim 21, wherein selecting a memory block comprises selecting a most frequently modified memory block among designated for RDMA transfer memory blocks having a size less than a difference of the pre-defined value and the amount of pinned memory in the first computer system.

* * * * *